Jan. 13, 1959
A. P. M. COX ET AL
2,868,733
LUMINESCENT MATERIAL
Filed July 9, 1956
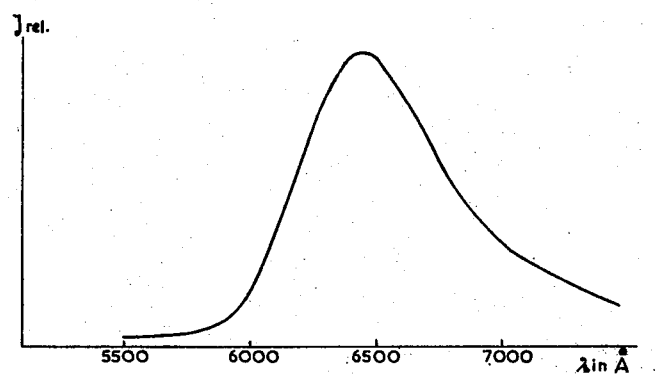
INVENTOR
ANNA PETRONELLA MARIA COX
AGE HULKE HOEKSTRA
PIETER ZALM
BY
AGENT

United States Patent Office 2,868,733
Patented Jan. 13, 1959

2,868,733
LUMINESCENT MATERIAL

Anna Petronella Maria Cox, Age Hylke Hoekstra, and Pieter Zalm, Eindhoven, Netherlands, assignors, by mesne assignments, to North American Philips Company, Inc., New York, N. Y., a corporation of Delaware Application July 9, 1956, Serial No. 596,715

Claims priority, application Netherlands July 8, 1955

3 Claims. (Cl. 252—301.4)

This invention relates to luminescent screens and luminescent material for use in cathode-ray tubes for flying-spot scanning of films and diapositives. Furthermore, the invention relates to a method of producing said luminescent material and to cathode-ray tubes comprising such a screen or luminescent material.

For producing television signals in transmitting pictures from films or diapositives the light-source nowadays widely used in scanning is a cathode-ray tube, in which a raster is formed on the luminescent screen, which raster is projected onto the film picture or diapositive with the aid of suitable optical means. Such devices and cathode-ray tubes are termed flying-spot scanners.

One of the chief requisites imposed on the luminescent materials for the screen of such tubes is that the decay time have a value below $10^{-6}$ sec. (The term decay time of the luminescence is to be understood to mean the time period in which the intensity of the emitted radiation after excitation drops to a value equal to $1/e$ times the intensity during excitation just before it ceases.) A number of materials are known which fulfil this condition. For the transmission of films and diapositives in monochrome the spectral distribution of the light emitted by the luminescent materials is of minor importance so long as the photo-electric cell converts the transmitted light into sufficiently strong electric pulses. Naturally, however, they should not only have a short decay time, but also a satisfactory yield of energy.

For producing television-signals in scanning coloured films and diapositives, however, the spectral distribution of the light emitted by the luminescent screen in the cathode-ray tube is of paramount importance. The luminescent screen usually comprises a mixture of three luminescent materials, the emission-maxima of which are in the blue, green and red portion of the spectrum respectively. A fairly large number of suitable materials with an emission-maximum in the blue and the green part is available, but the number of materials with an emission having its maximum in the red part and the required short decay time and a satisfactory yield is comparatively small.

A luminescent screen according to the invention, more particularly suitable for use in cathode-ray tubes for flying-spot scanning of films and diapositives, has the feature that it contains red-luminescent, bismuth-activated, calcium-magnesium silicate, in which the ratios in atoms of the several elements fulfil the conditions:

(a) $\dfrac{Ca}{Ca+Mg+Si}$ between 0.2 and 0.3

(b) $\dfrac{Mg}{Ca+Mg+Si}$ between 0.2 and 0.3

(c) $\dfrac{Si}{Ca+Mg+Si}$ between 0.5 and 0.6

(d) $\dfrac{Bi}{Ca+Mg+Si}$ between 0.001 and 0.1

Bismuth-activated, calcium magnesium silicates satisfying the aforesaid conditions have a spectral distribution with an emission-maximum between 6400 A. and 6500 A. The position of this maximum only slightly depends upon the quantity of bismuth present in the material and upon the ratio between the calcium and magnesium.

The energy-yield of the bismuth-activated calcium-magnesium silicates according to the invention is between 0.6% and 2.0%. The decay-time is around $10^{-6}$ sec.

Red-luminescent, bismuth-activated, calcium-magnesium silicates according to the invention are produced in a simple manner by heating a mixture of the oxides of calcium, magnesium, silicon and bismuth or of compounds, from which these oxides are obtained by heating, in an oxidizing atmosphere, the heating-temperature being chosen between 1100° C. and 1200° C. while heating for 2 to 6 hours.

The compounds used for carrying out the method in accordance with the invention may be oxides, nitrates and carbonates of calcium, magnesium and bismuth. Silicon is preferably added as oxide. Alternatively, mixtures of these compounds may be used.

Several examples of production methods are given below.

Example I

A mixture of 2.00 g. $CaCO_3$
1.21 g. $MgO$
3.00 g. $SiO_2$ is suspended in 40 ml. of alcohol, and ball-milled for 16 hours by means of steatite balls with the addition of 3 ml. of an aqueous nitric solution of $Bi(NO_3)_3$, the bismuth concentration being $10^{-4}$ gram atoms per ml. The suspension obtained is evaporated to dryness and the dry material pulverized in a mortar. The dry powder thus obtained is passed over into an Alundum crucible and fired for 4 hours at a temperature of 1125° C. in air. The energy-yield of the red-luminescing material obtained is 0.7%.

Example II

A mixture of 2.00 g. $CaCO_3$
2.53 g. $MgCO_3$
3.00 g. $SiO_2$
1.17 g. $Bi_2O_3$ is suspended in 40 ml. of alcohol and ball-milled by means of steatite balls for 16 hours. After concentration of the suspension the dry powder is passed over into an Alundum crucible and fired at 1200° C. for 2 hours in air, the red-luminescing powder thus obtained has an energy-yield of 0.9%.

Example III

A mixture of 2.50 g. $CaCO_3$
2.11 g. $MgCO_3$
3.00 g. $SiO_2$ is suspended in 40 ml. of alcohol and ball-milled by means of steatite balls for 16 hours with the addition of 80 ml. of an aqueous nitric solution of $Bi(NO_3)_3$ containing $10^{-4}$ gram atoms bismuth per ml. The suspension obtained is evaporated to dryness and the dry material passed over into an Alundum crucible, in which it is fired at a temperature of 1150° C. for 4 hours in air. The red-luminescing product has an energy-yield of 1.7%.

Example IV 2.00 g. $CaCO_3$
0.81 g. $MgO$
3.60 g. $SiO_2$
2.34 g. $Bi_2O_3$ are mixed in a mortar, the mixture obtained being fired in an Alundum crucible for 6 hours at a temperature of 1100° C. in air, the energy-yield of the red-luminescing product thus obtained being 0.9%.

In order that the invention may be readily carried into effect reference is made to the accompanying drawing, which is a graphical representation with an emission-curve. The wave-length of the radiation under electron excitation is plotted in A.-units on the abscissa of the graph, the intensity in arbitrary units being plotted on the ordinate. The curve holds for all four examples, since the luminescent materials thus produced substantially have the same emission.

What is claimed is:

1. A luminescent material consisting essentially of a bismuth-activated, calcium-magnesium silicate in which the atomic ratios of the elements fall within the following range:

$\frac{Ca}{Ca+Mg+Si}$ lies between about 0.2 and 0.3

$\frac{Mg}{Ca+Mg+Si}$ lies between about 0.2 and 0.3

$\frac{Si}{Ca+Mg+Si}$ lies between about 0.5 and 0.6, and $\frac{Bi}{Ca+Mg+Si}$ lies between about 0.001 and 0.1

2. A method of producing a luminescent bismuth activated calcium-magnesium silicate comprising the steps of preparing a mixture of oxides and oxide forming compounds of bismuth, calcium-magnesium and silicon in which the atomic ratios of the elements fall within the following range:

$\frac{Ca}{Ca+Mg+Si}$ lies between about 0.2 and 0.3

$\frac{Mg}{Ca+Mg+Si}$ lies between about 0.2 and 0.3

$\frac{Si}{Ca+Mg+Si}$ lies between about 0.5 and 0.6, and $\frac{Bi}{Ca+Mg+Si}$ lies between about 0.001 and 0.1 and heating said mixture in an oxidizing atmosphere at a temperature from about 1100° C. to 1200° C. for about 2 to 6 hours.

3. The method of claim 2 in which the silicon compound is present as silicon dioxide in the mixture before heating.

References Cited in the file of this patent

FOREIGN PATENTS 572,771   Great Britain _____ Oct. 23, 1945

OTHER REFERENCES

Kroger: Some Aspects of the Luminescence of Solids, 1948, p. 264.